United States Patent
Zablocki et al.

(10) Patent No.: US 10,938,853 B1
(45) Date of Patent: Mar. 2, 2021

(54) REAL-TIME DETECTION AND CLUSTERING OF EMERGING FRAUD PATTERNS

(71) Applicant: Amazon Technologies, Inc., Seattle, WA (US)

(72) Inventors: Jakub Zablocki, Kirkland, WA (US); Daniel Mahon, Seattle, WA (US); Shantanu Chandra, Seattle, WA (US); Pramod Singh, Bothell, WA (US); Jianbo Liu, Bethesda, MD (US)

(73) Assignee: Amazon Technologies, Inc., Seattle, WA (US)

( * ) Notice: Subject to any disclaimer, the term of this patent is extended or adjusted under 35 U.S.C. 154(b) by 371 days.

(21) Appl. No.: 16/116,579

(22) Filed: Aug. 29, 2018

(51) Int. Cl.
*H04L 29/06* (2006.01)
*G06F 16/28* (2019.01)
*G06F 16/901* (2019.01)
*G06N 7/00* (2006.01)

(52) U.S. Cl.
CPC ........ *H04L 63/1483* (2013.01); *G06F 16/285* (2019.01); *G06F 16/9024* (2019.01); *G06N 7/00* (2013.01); *H04L 63/0892* (2013.01); *H04L 63/1425* (2013.01); *H04L 63/20* (2013.01)

(58) Field of Classification Search
CPC ............... H04L 63/1483; H04L 63/20; H04L 63/1425; H04L 63/0892; G06F 16/285; G06F 16/9024; G06N 7/00
See application file for complete search history.

(56) References Cited

U.S. PATENT DOCUMENTS

| | | | |
|---|---|---|---|
| 6,405,251 B1* | 6/2002 | Bullard | H04L 43/026 709/224 |
| 10,803,169 B1* | 10/2020 | Flatten | G06N 20/00 |
| 2010/0077043 A1* | 3/2010 | Ramarao | H04L 51/12 709/206 |
| 2015/0180894 A1* | 6/2015 | Sadovsky | H04L 67/22 726/22 |
| 2015/0339477 A1* | 11/2015 | Abrams | G06F 21/316 726/23 |
| 2017/0068954 A1* | 3/2017 | Hockey | H04L 9/3213 |
| 2017/0103203 A1* | 4/2017 | Sharma | G06F 21/552 |
| 2017/0374083 A1* | 12/2017 | Cohen | H04L 63/1416 |
| 2018/0077174 A1* | 3/2018 | Hebert | G06F 21/554 |
| 2019/0205511 A1* | 7/2019 | Zhan | G06F 21/45 |

* cited by examiner

*Primary Examiner* — Joseph P Hirl
*Assistant Examiner* — Thomas A Gyorfi
(74) *Attorney, Agent, or Firm* — Eversheds Sutherland (US) LLP

(57) ABSTRACT

Systems, methods, and computer-readable media are disclosed for the dynamic, real-time detection and clustering of emerging fraud patterns. Example methods may include determining an expected account registration volume and an actual account registration volume during a same period of time. Certain methods may include determining an abnormal fluctuation in account registration volume based on a difference between the expected account registration volume and the actual account registration volume during the period of time. Certain methods may include generating subsets of account registrations received during the period of time based on one or more shared characteristics. Certain methods may include generating an account cluster based on the subsets of account registrations. Certain methods may include sending the account cluster to a bulk closure system.

20 Claims, 9 Drawing Sheets

REAL-TIME DETECTION AND CLUSTERING OF EMERGING FRAUD PATTERNS

BACKGROUND

Cloud computing resources, services, and systems are increasingly being leveraged by individuals and organizations due to the ease, cost benefits, and flexibility in usage associated with the cloud. Many of the cloud's key benefits, such as rapid elasticity, on-demand provisioning, and high availability are very appealing to a wide range of customers. However, despite these benefits, cloud computing has also exposed providers to various security and fraud related threats, as the benefits of the cloud are equally appealing to cybercriminals and unscrupulous organizations as they are to legitimate, ordinary customers. Fraudsters are constantly adapting their tactics to avoid paying for the services and platforms that they use, costing providers an enormous amount both in terms of the potential revenue lost and in terms of the increased operating costs associated with the fraudulent use of their cloud-based services. Outbreaks of new fraud patterns are emerging on a daily or weekly basis, and being able to quickly and effectively identify and mitigate these threats has become increasingly important to the providers of these services.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Fraudsters are constantly adapting their tactics to avoid paying for the cloud-based services and platforms that they use. One common tactic employed by fraudsters is to spoof or otherwise fraudulently create and register a large number of accounts that access and use the cloud-based computing resources, services, and systems for free until the accounts are identified and shut down. Although a large portion (e.g., 20%, 40%, 60%, etc.) of these fraudulent account registration attempts may be blocked or contained by various machine learning models and rulesets at the time of account registration or at the time of the first fraudulent resource access request (e.g., the first launch of a cloud-based computing instance), a significant portion of these fraudulent accounts may need to be examined one at a time. This review is often done manually by expert investigators using additional verification tools, and can be costly to implement. Historically, the reliance on manual reviews has led to up to a 3, 4, or 5-fold increase in manual investigation volume during large fraud outbreaks, resulting in long delays (e.g., 2 to 4 weeks or longer) in reaching fraud/non-fraud decisions for a particular account. Moreover, fraudsters may leverage this investigation delay as a window of opportunity to freely use various cloud-based services while fraud/non-fraud decisions for their fraudulent accounts are pending.

Embodiments of the disclosure include devices, systems, methods, computer-readable media, techniques, and methodologies for the real-time detection and clustering of emerging fraud patterns. Certain embodiments provide new techniques for detecting abnormal fluctuations in account registration volume in real-time or near real-time. Once anomalies are identified, certain embodiments provide newly developed graph-based clustering algorithms to refine fraudulent account clusters for proactive bulk closure. Although described primarily in the context of detecting and preventing the fraudulent use of cloud-based computing resources, aspects of the invention may be applied to various other systems, platforms, and services.

Figure 1:
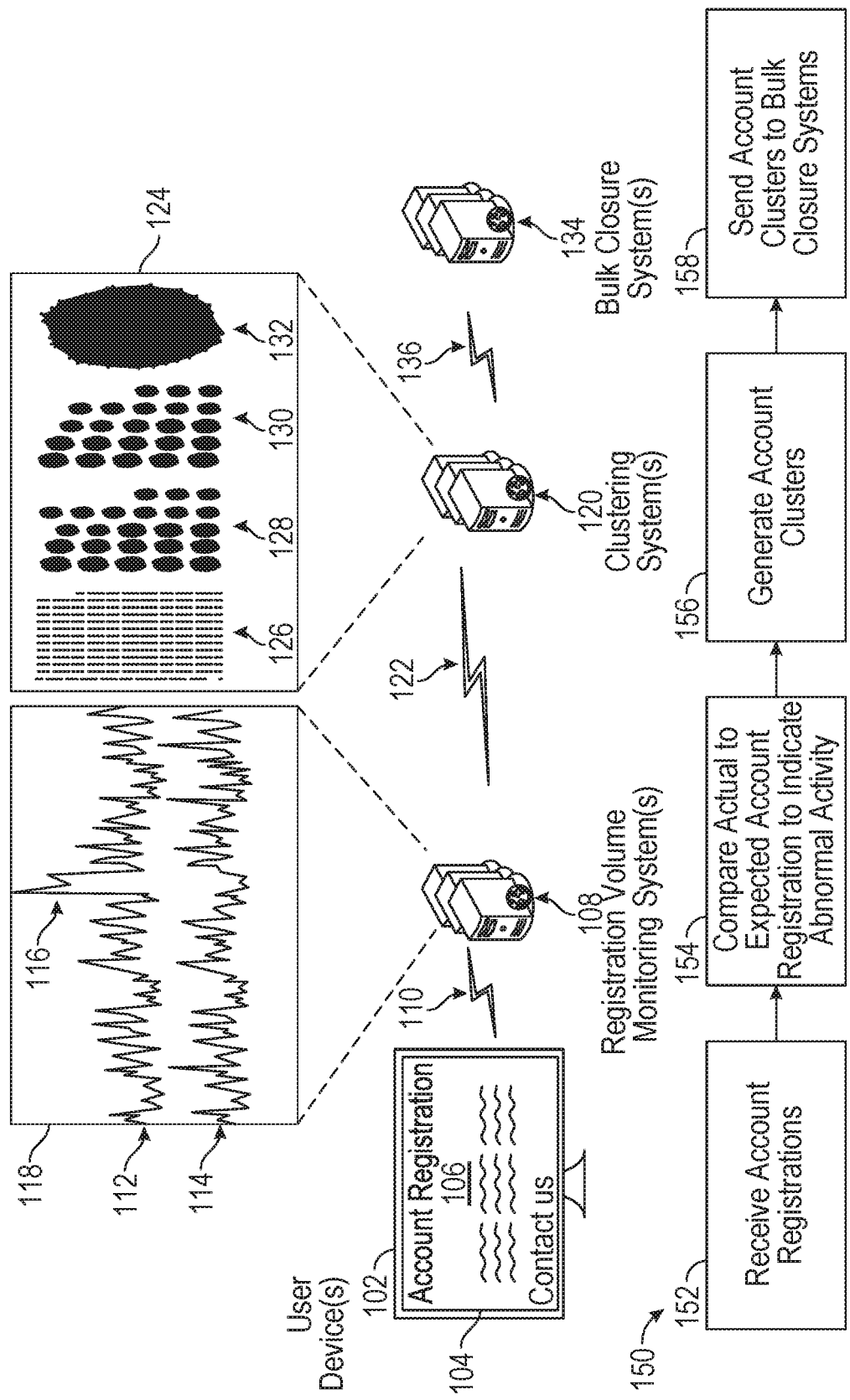
FIG. 1 is a hybrid system and process diagram illustrating the real-time detection and clustering of emerging fraud patterns in accordance with one or more example embodiments of the disclosure.

Referring to FIG. 1, an example use case 100 illustrating the real-time detection and clustering of emerging fraud patterns is depicted in accordance with one or more example embodiments of the disclosure. As illustrated in FIG. 1, one or more user devices 102, each having a user interface 104, may be used by one or more users to complete one or more account registrations 106. The user device 102 may include any suitable processor-driven device including, but not limited to, a mobile device or a non-mobile, e.g., a static, device. For example, the user device 102 may include a digital set-top box, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

In one embodiment, a registration volume monitoring system 108 can receive the one or more account registrations 106 over a network connection 110. In some embodiments, the account registration 106 is required to receive access to a cloud-based computing resource, platform, or service. The registration volume monitoring system 108 may include any suitable computing device capable of receiving and/or generating data including, but not limited to, a remote server or servers; a desktop computer; a laptop computer; a workstation, or the like.

In some embodiments, the registration volume monitoring system 108 monitors a difference between an actual account registration volume 112 and a predicted account registration volume 114 to identify registration volume anomalies 116. As depicted in FIG. 1, the registration volume anomaly 116 corresponds to a large, unexpected increase in account registration volume over a particular period of time as compared to the predicted account registration volume 114 over the same period of time. In some embodiments, the registration volume monitoring system 108 continuously monitors the actual and predicted account registration volumes 112 and 114. In some embodiments, the registration volume monitoring system 108 monitors the actual and predicted account registration volumes 112 and 114 over a particular period of time, such as one or more hours, one or more days, etc. In some embodiments, the registration volume monitoring system 108 generates, displays, or otherwise provides a registration monitoring module 118 for comparing the actual account registration volume 112 to the predicted account registration volume 114.

Figure 2:
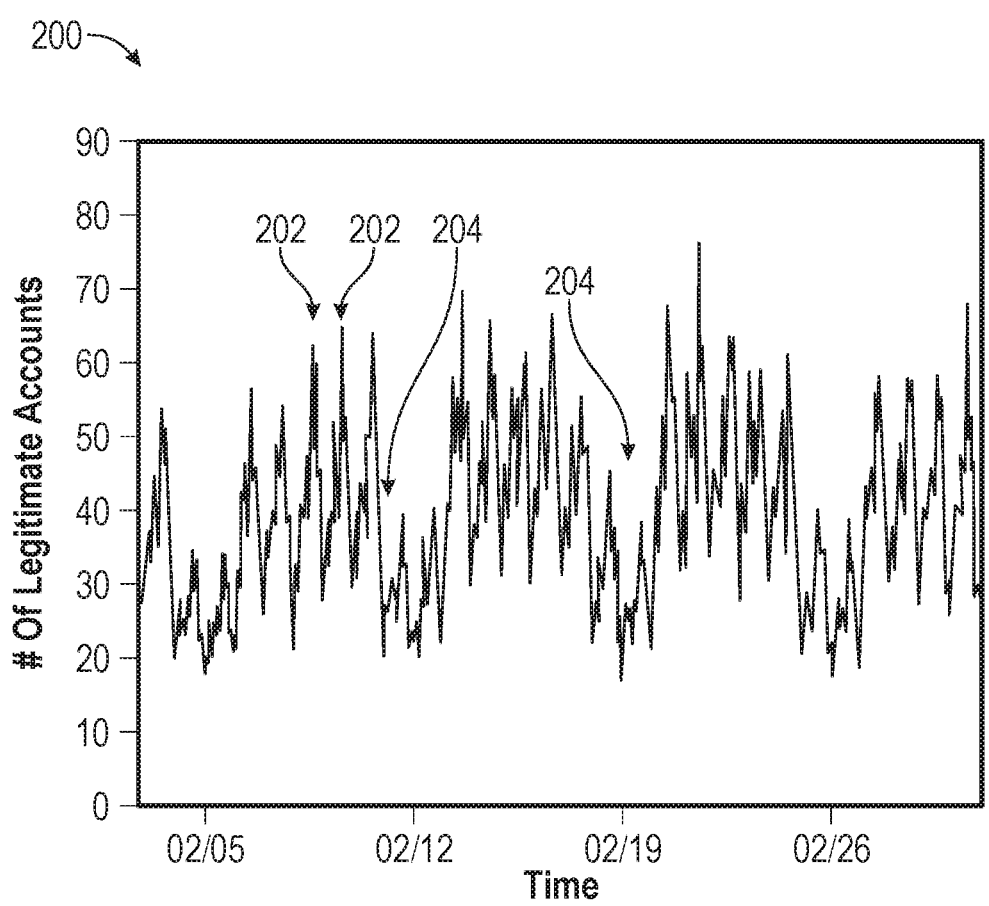
FIG. 2 is a schematic illustration of an exemplary graph depicting changes in a legitimate account registration volume over a period of time in accordance with one or more example embodiments of the disclosure.

The account registration volume for legitimate customers normally exhibits stable patterns of hourly, daily, weekly, and seasonal fluctuation (see, e.g., FIG. 2). These fluctuations are due, for example, to peak working hours, weekdays, national holidays, etc. In some embodiments, a deviation from these normal, expected fluctuation patterns provides an early sign of a fraudulent attack by mass account registration, a common tactic used by fraudsters.

In some embodiments, the registration volume monitoring system 108 detects sudden deviations from a normal pattern of fluctuation in registration volume by predicting the expected account registration volume of legitimate customers over the same period of time.

In some embodiments, the registration volume monitoring system 108 uses an autoregressive model to predict an expected account registration volume. In some embodiments, the autoregressive model includes exogenous inputs (ARX) to characterize the normal variations in the time series data. In some embodiments, the following formula may be used to account for the hourly, daily, weekly, and seasonal variability in the data as well as overall trends (e.g., generally increasing or decreasing annually, etc.) observed in the time series of registration volume:

$$\log y(t) = a_1 \log y(t-1) + \Sigma_{i=1}^{168} b_i x_i(t) + c_0 + c_i t + \varepsilon(t) \qquad (1)$$

Where "t" is the time of registration in hours, "y(t)" is the hourly registration of legitimate customers at time t, "$\varepsilon(t)$" is the process noise, and "$x_i(t)$," wherein i=1, ..., 168, are a set of dummy variables that encode the $i^{th}$ hour of time stamp t since the beginning of the corresponding week (e.g., $x_i(t)$ is equal to 1 if t is the $i^{th}$ hour since the beginning of the corresponding week, and 0 otherwise).

In some embodiments, the term $a_i \log y(t-1)$ describes the dependency of the model on previous observations, the term $\Sigma_{i=1}^{168} b_i x_i(t)$ characterizes the daily and weekly seasonality in the data, the term $c_0$ accounts for any offset in the data, and the term $c_i t$ characterizes the increasing or decreasing trend in the data. For example, $c_i t$ will be positive for increasing trends, and negative for decreasing trends.

In some embodiments, the registration volume monitoring system 108 can make one or more step ahead predictions based on the model equation (1) described above. For example, a prediction confidence interval for the $k^{th}$-step ahead prediction may be constructed as:

$$[\exp(\log \hat{y}_k - z_{a/2} \hat{\sigma}_k), \exp(\log \hat{y}_k + z_{1-a/2} \hat{\sigma}_k)] \qquad (2)$$

Where "$\hat{y}_k$" is the $k^{th}$-step ahead prediction of the hourly registration volume, "$\alpha$" is the confidence level, "$\hat{\sigma}_k$," equal to $$\sqrt{\sum_{j=0}^{k-1} a_1^{2j} \hat{\sigma}^2},$$

is the estimated standard deviation of log $\hat{\sigma}_k$, and "$\hat{\sigma}^2$" is the estimated variance while fitting the model described above in equation (1). In some embodiments, an uncertainty in the model parameter estimate itself may be ignored as the number of samples far exceeds the number of model parameters.

The model described above with respect to equation (1) may be generated based on any suitable time period. In some embodiments, two year historical records of legitimate customer account registrations are used to generate the models, although other time periods (e.g., one or more months, one or more years, a week, a day, etc.) are within the contemplated scope of the disclosure. In some embodiments, a rolling historical record (known as a process window) of a suitable duration (e.g., two years), is selected to end at some point prior to the current time (e.g. a month prior to the current time). The rolling historical record may be continuously generated and used to make hourly account registration volume predictions for the period of time between the current time and the end of the process window. For example, a two year long process window ending one month prior to the current time can be used to make expected hourly account registration volume predictions for the period of time starting at the end of the process window and ending at the current time (e.g., a period of one month).

In some embodiments, any deviation from the predicted hourly registration of legitimate accounts may be considered by the registration volume monitoring system 108 as an anomaly that warrants investigation. In some embodiments, a threshold deviation may be set manually (e.g., by an operator of the registration volume monitoring system 108) or automatically (e.g., based on machine learning rules) which must be exceeded to trigger an anomaly warning for investigation. In some embodiments, the threshold for detecting anomalies can be set by changing the significance level a in equation (2). In other words, the value of the significance level a may be used to increase or decrease the aggressiveness of the registration volume monitoring system 108 in detecting account registration volume anomalies. For example, the value of a in formula (2) can be increased from 50% to 95% to decrease the aggressiveness (increase the required confidence threshold) of the registration volume monitoring system 108.

In some embodiments, the registration volume monitoring system 108 identifies the modus of operandi (MO) of a fraudulent attack by simultaneously monitoring multiple data streams of account registrations that are grouped based on common or shared account attributes. In some embodiments, the registration volume monitoring system 108 groups the registered accounts based on shared account attributes such as, for example, the geographic location of the source of the account registration request and the utilized internet service providers. In this manner, the registration volume monitoring system 108 may identify the MO associated with a particular fraudulent attack, such as where the fraudulent attack is originated from, in near real-time, to increase the lead-time to mitigate the potential impact of the attack.

In some embodiments, to identify the most potentially damaging MOs, the registration volume monitoring system 108 ranks all distinct combinations of account attributes based on their respective predicted fraud volumes (e.g., based on the expected deviation of the hourly registration volume from the predicted values). In some embodiments, the registration volume monitoring system 108 models the hourly registration volume of all legitimate accounts for each combination of account attributes.

In some embodiments, the registration volume monitoring system 108 minimizes modeling efforts by selectively modeling the hourly registration volume of all legitimate accounts only for the most impactful combinations of account attributes. For example, the registration volume monitoring system 108 may selectively model only the hourly registration volume of all legitimate accounts for each distinct combination of credit card issuing country, credit card prepaid status, and autonomous system number (ASN), when those categories each represent one of the most impactful attributes based on their respective predicted fraud volumes. Monitoring account registration volume grouped by account attributes advantageously improves the sensitivity of anomaly detection because sudden increases in account registration volume from only a particular combination of account attributes may not trigger an alarm in the total aggregated hourly registration counts.

In some embodiments, the registration volume monitoring system 108 can proactively identify accounts matching a particular known MO. For example, if the most impactful MO in terms of predicted fraud volume includes prepaid credit cards from a particular county and registrations originated from a particular ASN, account registrations using prepaid credit cards from the particular country that originate from the particular ASN can be proactively terminated or most closely monitored.

As described previously herein, the registration volume monitoring system 108 may detect abnormal fluctuations in account registration volume and can identify potential MOs by monitoring the deviations between the actual account registration volume and the predicted hourly account registration volume of legitimate customers by various combinations of account attributes. By identifying the potential fraud MOs in near real-time, the registration volume monitoring system 108 allows for the early detection and bulk closure of fraudulent accounts early in the process, before the fraudsters are able to access any cloud-based systems associated with the account registration process. Such a system is complementary to current conventional fraud detection schemes, and may be used to significantly speed up fraud/no fraud decisions, especially during high volume fraud outbreaks caused by mass account registrations.

In some embodiments, the registration volume monitoring system 108 may compare a predicted fraudulent account registration volume with a currently known fraudulent account registration volume. In this manner, the registration volume monitoring system 108 allows for a quantitative assessment in the effectiveness of the overall fraud prevention efforts and for the identification of system segments that require further actions or refinements.

In some embodiments, the registration volume monitoring system 108 provides an alert or warning to a clustering system 120 when a registration anomaly is discovered over a certain period of time according to one or more embodiments. In some embodiments, the registration volume monitoring system 108 provides account details for one or more accounts registered during the period of time associated with the registration anomaly. In some embodiments, the clustering system 120 can receive the one or more account registrations associated with the anomaly over a network connection 122. The clustering system 120 may include any suitable computing device capable of receiving and/or generating data including, but not limited to, a remote server or servers; a desktop computer; a laptop computer; a workstation, or the like.

Because fraudsters often register or attempt to register many accounts that share similar attributes or characteristics, as generating individually unique fraudulent accounts with no shared or reused characteristics is prohibitively expensive. These characteristics can include, for example, the use of a same device while signing up for or signing in to a cloud-based service, the use of a same or similar email alias (e.g., abc@service1.com and abd@service1.com), the use or launch of the same types of instances provided by the cloud service, the use of the same or a similar payment instrument, a same or similar phone number, a same or similar mailing or billing address, a same or similar IP address, a same or similar device ID (e.g., a UBID), a same or similar session or software ID (e.g., a same flash installation ID), a same or similar fingerprint, or any other shared characteristic.

In some embodiments, the clustering system 120 applies one or more graph-based models 124 to automatically detect emerging fraud MOs by clustering accounts based on their mutually shared characteristics. As depicted in FIG. 1, the graph-based models 124 include a first characteristic 126, a second characteristic 128, a third characteristic 130, and a fourth characteristic 132. It is understood, however, that the graph-based models 124 may be based on any number of shared or common account characteristics. As depicted in FIG. 1, the graph-based models 124 include a large number of accounts, all of which share the same fourth characteristic 132. As further depicted in FIG. 1, various subsets of the accounts share a same second characteristic 128 and a same third characteristic 130.

Grouping accounts together into tightly related clusters having shared characteristics provides additional evidence about the collective behavior of potential fraudsters that otherwise may not be apparent to investigators limited to investigating accounts one at a time. Moreover, grouping accounts together into tightly related clusters also opens new opportunities for bulk investigation that scale with high fraud volume, especially during outbreaks. Applying graph-based account clustering for fraud prevention also offers robustness to adversarial actions by fraudsters, as it is prohibitively expensive for fraudsters to create individually unique accounts with no shared or reused characteristics.

In some embodiments, the one or more graph-based models 124 include graphs having vertices and edges. In some embodiments, vertices denote individual objects, such as accounts or account attributes (e.g., a credit card number or an IP address), while edges denote the relationships between the vertices. For example, an account i logged in from IP address k may be denoted by an edge between the account i vertex and the IP address k vertex. In some embodiments, either or both vertices and edges can have additional properties (e.g., the email address of an account i and the time stamp when account i logged in from IP address k).

As discussed previously herein, the nature of fraud often exhibits itself as relational and retrospective analysis of fraud outbreaks suggests that a majority of attacks are originated by related groups of fraudsters. Fraudulent accounts often form large clusters that are tightly linked by certain subset of attributes. In some embodiments, account attributes are collected at the time of account registration. In some embodiments, account attributes are collected at the time a user attempts to use the registered account to access one or more cloud-based services.

Once one or more account clusters have been identified, the clustering system 120 can provide the account clusters to a bulk closure system 134 for bulk investigation. In this manner, the clustering system 120 allows for bulk decisions to be made over entire clusters of accounts that share similar attributes, greatly reducing the response time to mitigate the impact of fraudulent account registration outbreaks. In some embodiments, the bulk closure systems 134 receives one or more account clusters from the clustering system 120 over a network connection 136. The bulk closure system 134 may include any suitable computing device capable of receiving and/or generating data including, but not limited to, a remote server or servers; a desktop computer; a laptop computer; a workstation, or the like. In some embodiments, the bulk closure system 134 is an investigator workbench.

To detect and cluster emerging fraud patterns in real-time, an example process flow 150 is presented and may be performed, for example, by the registration volume monitoring system 108, the clustering system 120, and/or the bulk closure system 134. The registration volume monitoring system 108, the clustering system 120, and/or the bulk closure system 134 may each include at least one memory that stores computer-executable instructions and at least one processor configured to access the at least one memory and execute the computer-executable instructions to perform various actions or operations, such as one or more of the operations in the process flow 150 of FIG. 1.

At a first block 152, one or more user devices 102 are used to complete one or more account registrations 106 according to one or more embodiments. In some embodiments, these account registrations are received or otherwise monitored by the registration volume monitoring system 108.

At block 154, the registration volume monitoring system 108 compares the actual account registration volume 112 to the predicted account registration volume 114 according to one or more embodiments. In some embodiments, the registration volume monitoring system 108 indicates one or more registration anomalies based on the comparison. For example, an anomaly over a particular period of time may be indicated when the actual account registration volume 112 during this period of time exceeds the predicted account registration volume 114 by a predetermined threshold. In some embodiments, one or more accounts associated with one or more anomalies are identified by the registration volume monitoring system 108 and provided to the clustering system 120 for further analysis.

At block 156, the clustering system 120 generates one or more account clusters according to one or more embodiments. In some embodiments, the clustering system 120 generates clusters having shared characteristics. In some embodiments, the clustering system 120 generates a graph-based model where each account may be assigned to a unique vertex, and an edge may be generated between pairs of vertices when the associated accounts share at least one characteristic. In some embodiments, an edge may be generated between pairs of vertices when the associated accounts share a number of characteristics greater than a predetermined threshold. For example, an edge may only be generated between pairs of vertices when the associated accounts share at least three, or four, or ten characteristics. In some embodiments, an edge may only be generated between pairs of vertices when the associated accounts share all known characteristics.

At block 158, the clustering system 120 provides one or more account clusters to the bulk closure system 134 according to one or more embodiments. In some embodiments, the bulk closure system 134 includes hardware or software for automatically or manually investigating the account clusters for bulk closure. For example, an investigator may use the bulk closure system 134 to manually review and close an account cluster. In another example, the bulk closure system 134 may use one or more rules to automatically close the account cluster.

Example embodiments of the disclosure provide a number of technical features or technical effects. For example, in accordance with example embodiments of the disclosure, certain embodiments of the disclosure may receive one or more account registrations from one or more sources, generate an autoregressive model having exogenous inputs to determine one or more account registration volume predictions, compare the actual account registration volume to the predicted account registration volume to identify registration anomalies, generate a graph-based model to cluster accounts, and provide one or more clustered accounts to a bulk closure system for bulk review.

Embodiments of the disclosure may greatly improve the sensitivity of fraudulent account registration detection. Embodiments of the disclosure may improve computing efficiency by reducing the number of unique accounts which need to be investigated for fraud/no fraud decisions. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

FIG. 2 schematically illustrates an exemplary graph 200 depicting changes in a legitimate account registration volume over a period of time in accordance with one or more example embodiments of the disclosure. As discussed previously herein, the account registration volume for legitimate customers normally exhibits stable patterns of hourly, daily, weekly, and seasonal fluctuation. These fluctuations are due, for example, to peak working hours, weekdays, national holidays, etc. In some embodiments, a deviation from these normal, expected fluctuation patterns provides an early sign of a fraudulent attack by mass account registration, a common tactic used by fraudsters.

As illustrated in FIG. 2, the graph 200 includes cyclical fluctuations associated with peak registration volumes 202, as well as cyclical fluctuations associated with minimal registration volumes 204. As described previously herein, periods of peak registration volume may be correlated with peak working hours or other times associated with higher user activity, while periods of minimal registration volume may be correlated with weekends hours or other times associated with lower user activity. In some embodiments, the graph 200 or the data contained therein is used to forecast or otherwise predict a future expected registration volume according to one or more embodiments. For example, the data in the graph 200 may be used by the registration volume monitoring system 108 depicted in FIG. 1.

Figure 3:
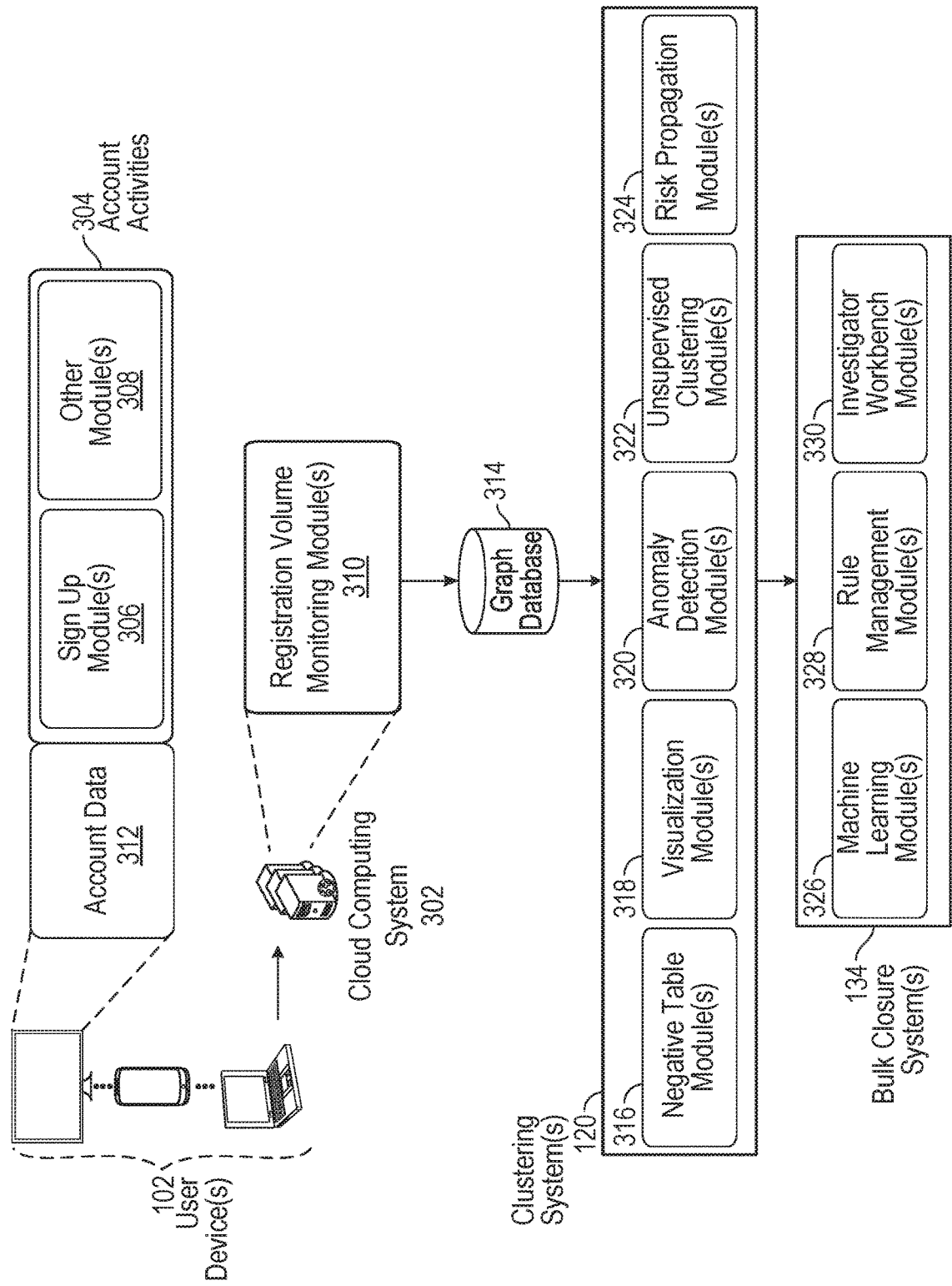
FIG. 3 is a hybrid system and process diagram for the real-time detection and clustering of emerging fraud patterns in accordance with one or more example embodiments of the disclosure.

FIG. 3 schematically illustrates an example use case and an exemplary hybrid system and process diagram for the real-time fraud detection and clustering of emerging fraud patterns in accordance with one or more example embodiments of the disclosure. As illustrated in FIG. 3, one or more user device(s) 102 are communicatively coupled to one or more remote cloud computing system(s) 302 for receiving or otherwise accessing various cloud computing resources and platforms.

In some embodiments, each of the user devices 102 interfaces with the cloud computing system 302 through various account activities 304. For example, in some embodiments, a user device 102 may sign up or otherwise register for access to the cloud computing system 302 using a sign up module 306. In some embodiments, a user device 102 may interact with the cloud computing system 302 via one or more other modules 308. In some embodiments, for example, a user device 102 may sign in or otherwise access the cloud computing system 302 using a sign in module. In some embodiments, a user device 102 may launch one or more instances or services offered through the cloud computing system 302 using a launch instance module.

In some embodiments, the cloud computing system 302 may include one or more registration volume monitoring module(s) 310. The one or more registration volume monitoring module(s) 310 may perform one or more operations of the registration volume monitoring system 108 (depicted in FIG. 1), according to one or more embodiments. For example, the one or more registration volume monitoring module(s) 310 may continuously monitor the registration velocity of certain account clusters and may raise an alarm if the velocity is higher than expected.

In some embodiments, the cloud computing system 302 collects various account data 312 from the user device 102. The account data 312 may be collected during account registration, at the time the user device 102 accesses one or more resources of the cloud computing system 302, or may be continuously or periodically collected every time the user device 102 interacts with the cloud computing system 302.

The account data 312 may include any user or device specific data, such as, for example, basic account information necessary for payment and user contact. In some embodiments, the account data 312 includes one or more of a payment instrument (e.g., credit card type and number), a phone number, a mailing address, an email address, a billing address, a list of cloud computing instances requested, an IP address, a device identifier (e.g., a unique browser ID saved as a cookie on the device), a software identifier (e.g., a flash installation ID generated during software installation), a fingerprint (e.g., biometric data, or other situational data that may be used to uniquely identify a user device, such as a browser or user interface font), or any other data capable of uniquely identifying the user or the user device 102.

As discussed previously herein, because of the high cost associated with creating fake or synthetic identities and covering up their traces online, fraudsters often register many accounts that share one or more attributes, especially during fraud outbreaks. This is in sharp contrast with accounts registered by legitimate customers, which have unique attributes. Consequently, the relations among accounts via account attributes provide valuable information about the collective fraud activities potentially originated from the same group of fraudsters, and thus open opportunities for bulk investigation.

To that end, in some embodiments, the cloud computing system 302 provides the various account data 312 to a graph database 314. In some embodiments, the graph database 314 includes or is associated with one or more graph-based clustering algorithms and models to refine fraudulent account clusters for proactive bulk closure according to one or more embodiments. In some embodiments, the graph database 314 models the account data 312 as a collection of vertices and edges, where the vertices represent individual accounts while edges represent pairs of accounts having a shared attribute.

In some embodiments, the graph database 314 supports sub-second real-time online queries and updates. In some embodiments, the graph database 314 is capable of supporting real-time low-latency online queries. In some embodiments, the graph database 314 supports the retrieval of large sub-graphs (e.g., sub-graphs having thousands or millions of nodes) by accounts, attributes, or both for offline graph analytics. In some embodiments, the graph database 314 is capable of integrating time stamps to both nodes and edges, and support queries by time for retrospective analysis. The use of time stamps allows for the graph database 314 to encode the full history of the dynamic changes in relations over time, making retrospective analysis possible (e.g., event triggered machine-learning model development).

In some embodiments, the graph database 314 is capable of integrating other properties, such as, for example, fraud type, to both nodes and edges. In some embodiments, the graph database 314 supports query by name-value pairs, although other database query schemes are within the contemplated scope of the disclosure.

It is worth stressing that graph-based clustering algorithms and models are powerful tools for fighting fraud because of their robustness against adversarial actions by the fraudsters and the relational nature of inbound fraudulent accounts during outbreaks. In some embodiments, the graph database 312 preserves the pairwise neighborhood relations among a given set of accounts/attributes based on the information collected by the cloud computing system 302 while the users of the user devices 102 (e.g., account owners) interact with the cloud computing system 302. In some embodiments, the graph database 314 may be used to identify and isolate tightly linked clusters of accounts that are potentially originated from the same fraudsters.

In some embodiments, the graph database 314 is integrated with or otherwise available to one or more clustering system(s) 120. To improve the conventional fraud detection process, the clustering system 120 and/or the graph database 314 may generate a graph encoding the various relations among both accounts and attributes. In some embodiments, the clustering system 120 includes one or more modules for analyzing the various account data 312 according to one or more embodiments. While the clustering system 120 is depicted as having a particular set of modules (e.g., a negative table module 316, a visualization module 318, an anomaly detection module 320, an unsupervised clustering module 322, and a risk propagation module 324) for ease of illustration and discussion, it is understood that the clustering system 120 may include some, all, or any combination of the disclosed modules, according to one or more embodiments. For example, in some embodiments, the clustering system 120 may include the anomaly detection module 320, the unsupervised clustering module 322, and the risk propagation module 324.

In some embodiments, the clustering system 120 includes a negative table module 316. In some embodiments, the negative table module 316 supports simple negative table queries for individual accounts/attributes. Negative table queries, while useful, may not alone offer the needed flexibility for retrospective reconstruction of the dynamic changes in relations.

In some embodiments, the clustering system 120 includes graph visualization modules 318 for displaying or otherwise presenting the various account data 312 to one or more users. In some embodiments, the clustering system 120 includes advanced analytic algorithms, including but not limited to anomaly detection, unsupervised clustering, and risk propagation (also referred to as label propagation). Despite the plethora of algorithms available for analyzing graphs, identifying and developing algorithms that work for detecting emerging fraud MO need to be capable of processing large graphs efficiently, require no or only minimal human intervention, provide cluster-level risk assessments, and produce interpretable results.

In some embodiments, the clustering system 120 includes an anomaly detection module 320. Anomaly detection on a graph can be loosely defined as finding the nodes, edges, and/or substructures of the graph that differ significantly from the relational patterns observed from the graph as a whole. The graph-based measures of this type of relational anomaly are problem specific and are largely governed by the underlying mechanism. Consequently, commonly used graph-based measures of relational patterns may not be effective in identifying meaningful anomalies for a given problem.

As discussed previously herein, emerging fraud MOs often exhibit unusually high levels of "regularity" in the relational patterns within certain clusters. For example, fraudsters may use the same credit card to create 10 different accounts. In some embodiments, the anomaly detection module 320 measures the local structural properties of the graph generated by the clustering system 120 using, for example, known nodal-level and egocentric network analysis techniques.

Figure 4:
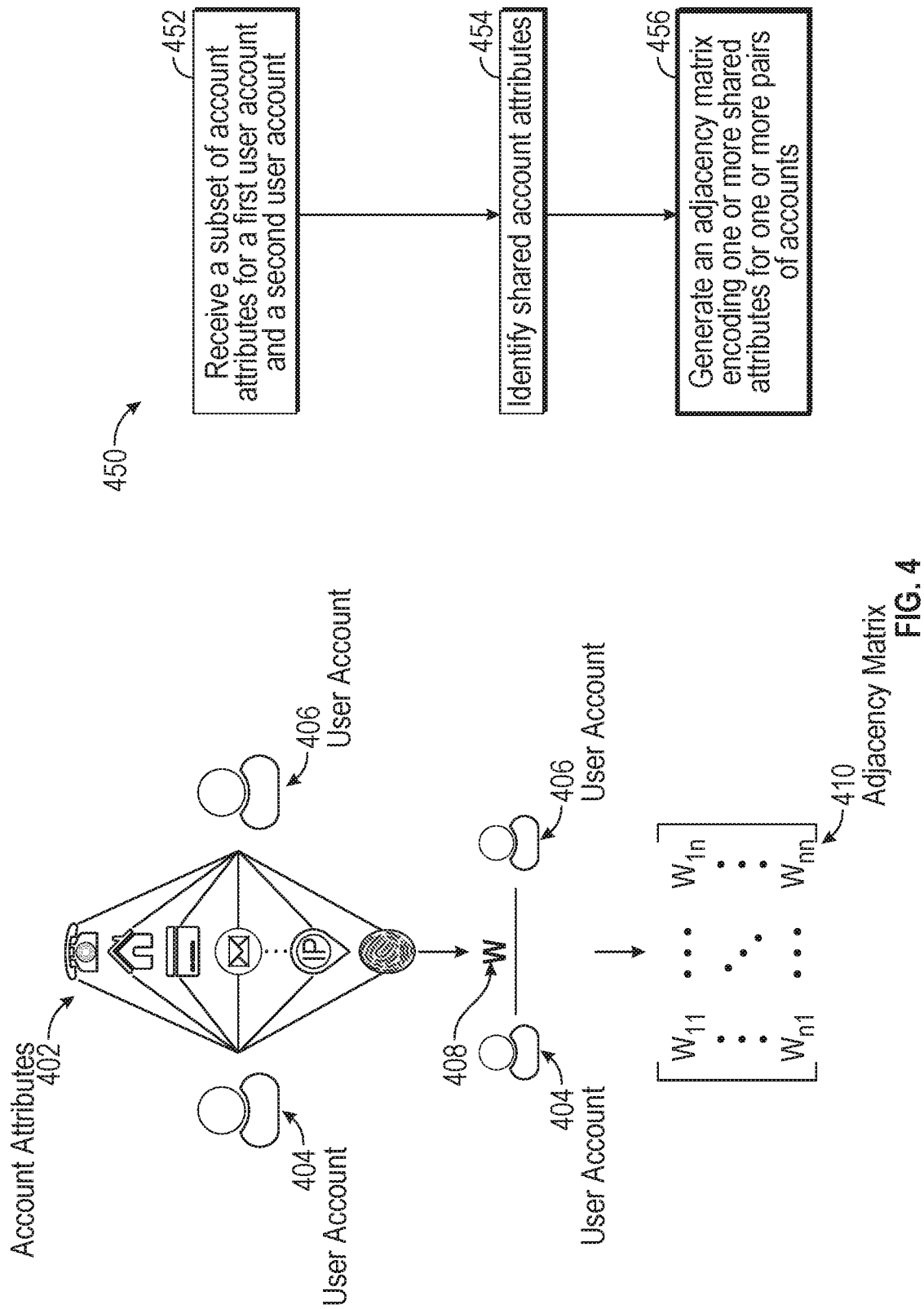
FIG. 4 is a hybrid system and process diagram for generating adjacency matrices in accordance with one or more example embodiments of the disclosure.

In some embodiments, the clustering system 120 includes an unsupervised clustering module 322. Compared to the development of graph-based anomaly detection algorithms, graph-based unsupervised clustering algorithms are more established. The most common approach is spectral clustering by decomposing matrices derived from the adjacency matrix that encodes the graph relations (see, e.g., FIG. 4 depicting an adjacency matrix). This approach, however, is computationally expensive for large graphs and requires a user to specify the desired number of clusters.

Because the number of clusters is usually not known beforehand, known parameter-free graph partitioning algorithms that include the co-clustering of both the rows and the columns of the adjacency matrix have been developed and are widely available. The computational time of this approach has been shown to scale linearly with the number of edges. In some embodiments, the unsupervised clustering module 322 relies upon known parameter-free graph partitioning algorithms that handle attributed graphs (e.g., graphs having nodes that are associated with properties). This type of parameter-free graph partitioning algorithm is ideally suited to emerging fraud MO identification as the number of clusters is not known beforehand.

In some embodiments, the clustering system 120 includes a risk propagation module 324. With the partial knowledge of the labels of some accounts and attributers in the graph, it is natural to exploit the relations among accounts and attributes to identify accounts that have a high risk of fraud ("guilt by association"). In some embodiments, the risk propagation module 324 iteratively infers the risk of neighborhood nodes based on the known labels of accounts/attributes using known analytical techniques, such as, for example, loopy belief propagation. Loopy belief propagation is advantageous, as fast algorithms exist for handling massive graphs. In some embodiments, the risk propagation module 324 leverages the more generic framework of discrete signal processing on graphs to classify fraud/non-fraud accounts using only a subset of accounts with known labels.

In some embodiments, the structure of the graph generated by the clustering system 120 dynamically changes as new accounts register and existing accounts interact with the cloud computing system 302. By closely monitoring these dynamic changes in the graph, emerging fraud MOs can be identified as they form.

In some embodiments, due to the massive size of the graph (e.g., in scenarios having a large number of accounts and account characteristics), the clustering system 120 divides the whole graph into smaller subgraphs for further analysis. In this manner, each module (e.g., the negative table module 316, the visualization module 318, the anomaly detection module 320, the unsupervised clustering module 322, and the risk propagation module 324) of the clustering system 120 may focus on each subgraph, reducing computational costs. In addition, splitting the graph into subgraphs improves the sensitivity of the graph to small anomalous changes.

In some embodiments, a registration volume monitoring system (e.g., the registration volume monitoring system 108 depicted in FIG. 1 or the registration volume monitoring module(s) 310 depicted in FIG. 3) continuously monitors the registration velocity of certain account clusters (e.g., accounts originated from the same IP address or credit card issuing country), and raises an alarm if the velocity is higher than expected. In some embodiments, once anomalies are detected, a clustering system having various clustering algorithms (e.g., the clustering system 120) can then be used to generate and then analyze the corresponding account/characteristic graphs and subgraphs to identify the exact emerging fraud MOs.

In some embodiments, the clustering system 120 uses various modules (e.g., the negative table module 316, the visualization module 318, the anomaly detection module 320, the unsupervised clustering module 322, and the risk propagation module 324) to identify one or more account clusters. In some embodiments, these account clusters are provided to a bulk closure system 134.

The bulk closure system 134 may include one or more modules for analyzing account clusters, making fraud/no fraud decisions, and bulk closing one or more fraudulent accounts. As depicted in FIG. 3, the bulk closure system 134 includes a machine learning module 326, a rule management module 328, and an investigator workbench module 330.

In some embodiments, one or more modules of the clustering system 120 (e.g., the anomaly detection module 320 and the unsupervised clustering module 322) can be directly integrated with one or more modules of the bulk closure system 134 (e.g., the investigator workbench module 330). In this manner, clusters of fraudulent accounts can be efficiently provided to the bulk closure system 134 for bulk investigation.

There are several potential use cases for the blocking or closing of fraudulent accounts. Blocking clusters of fraudulent accounts at the time of registration is the most appealing because it leads to minimal delays in reaching fraud/non-fraud decisions, and thus completely prevents fraudsters from using/abusing the cloud computing system 302 services. Grouping accounts together into tight clusters provides additional evidence that is otherwise not readily apparent to the investigators. By closely monitoring the changes in the relation-based graph as new accounts come in, emerging clusters may be detected earlier. Moreover, fraud/non-fraud decisions may be made on account clusters instead of on individual accounts.

In some embodiments, by tracking the growth in each fraud cluster, the clustering system 120 and/or bulk closure system 134 can automatically shut down fraudulent accounts associated with a known fraud cluster, especially as the fraud relations become mature over time.

Another potential use case of the bulk closure system 134 is the retrospective bulk closure of previously registered accounts. Similar to the closing of accounts at account registration, in some embodiments, the clustering system 120 (e.g., the graph-based anomaly detection module 320, the unsupervised clustering module 322, etc.) can be used to discover highly suspicious clusters of closely linked accounts for bulk closure that have gone unnoticed. Maintaining a cleaner separation of legitimate and fraudulent accounts makes the task of isolating fraud accounts from legitimate accounts easier and faster.

Another potential use case of the bulk closure system 134 is the fast tracking of fraudulent accounts for closure. In some embodiments, the real-time graph-based clustering provided by the clustering system 120 may be used to accelerate the termination schedule of the resources of known fraudulent account clusters, thus preventing the fraudsters from using the cloud computing system 302 services for an extended period of time while minimizing the impact on customers who might be incorrectly labeled as fraudulent.

In some embodiments, the clustering system 120 and/or the bulk closure system 134 may use known "fraud" or "legitimate" labels to propagate the fraud risk of active accounts to other closely associated accounts (e.g., other accounts having a number of shared characteristics greater than a predetermined threshold). In other words, risk levels can be generated for a set of accounts, and propagated to other accounts based on known fraud/legitimate labels. These risk levels can be consumed by both machine-learning models and rule sets.

FIG. 4 schematically illustrates an example use case and an exemplary hybrid system and process diagram for generating adjacency matrices in accordance with one or more example embodiments of the disclosure. As discussed previously herein, various clustering and graph-based algorithms may be used (e.g., by the clustering system 120 depicted in FIGS. 1 and 3) according to one or more embodiments to group accounts together into tight clusters. In some embodiments, account data including one or more account attributes for one or more pairs of accounts are used to generate one or more adjacency matrices.

An adjacency matrix is a concise representation of the relations among any given set of n accounts. In some embodiments, each row and column in the adjacency matrix corresponds to a particular account. In this manner, each cell of an adjacency matrix may encode a particular relation, such as, for example, whether a particular account characteristic is shared between a particular pair of accounts. In other words, the value of a cell in an adjacency matrix may be "0" when the corresponding account pair does not share the associated account characteristic, and may be "1" when the corresponding account pair do share the associated account characteristic. An adjacency matrix is usually sparse with most elements being zero, as the vast majority of accounts have unique attribute values.

In some embodiments, an adjacency matrix is generated for each account attribute. For example, an adjacency matrix may be generated for a set of 10 accounts to concisely quantify whether any account pairs within the set of 10 accounts have the same IP address.

In some embodiments, only a single adjacency matrix is generated and a threshold number of account characteristics must be shared before the associate cell value in the adjacency matrix indicates a match (e.g., a value of "1"). The threshold may be set to any desired number between 1 (only a single match is required) and the total number of account attributes (all attributes must match). For example, an adjacency matrix may be generated for a set of 10 accounts to quantify whether any account pairs within the set of 10 accounts have the same IP address, the same phone number, and the same billing address. In some embodiments, the value of a particular cell $w_{ij}$ is set to "1" if account i and account j share the same value for any given attribute, and is set to "0" otherwise.

To generate an appropriate adjacency matrix, an example process flow 450 is presented and may be performed, for example, by the registration volume monitoring system 108, the clustering system 120, and/or the bulk closure system 134 depicted in FIG. 1. As discussed previously herein, the registration volume monitoring system 108, the clustering system 120, and/or the bulk closure system 134 may each include at least one memory that stores computer-executable instructions and at least one processor configured to access the at least one memory and execute the computer-executable instructions to perform various actions or operations, such as one or more of the operations in the process flow 450 of FIG. 4.

At a first block 452, a subset of one or more account attributes 402 for a first user account 404 and a second user account 406 are identified. As discussed previously herein, the account attributes 402 may include, for example, the use of a same device while signing up for or signing in to a cloud-based service, the use of a same or similar email alias (e.g., abc@service1.com and abd@service1.com), the use or launch of the same types of instances provided by the cloud service, the use of the same or a similar payment instrument, a same or similar phone number, a same or similar mailing or billing address, a same or similar IP address, a same or similar device ID (e.g., a UBID), a same or similar session or software ID (e.g., a same flash installation ID), a same or similar fingerprint, or any other shared characteristic. While discussed in the context of a single pair of accounts for ease of illustration, it is understood that an adjacency matrix may be generated for an arbitrary number of accounts.

At block 454, similarities between one or more account attributes 402 for a first user account 404 and a second user account 406 are identified. In some embodiments, a first shared account attribute 408 may be identified. For example, the first user account 404 and the second user account 406 may share a same device ID, or a same or similar email alias.

At block 456, an adjacency matrix 410 is generated and modified to encode one or more shared attributes for one or more pairs of accounts. For example, a value in the adjacency matrix corresponding to the first user account 404 and the second user account 406 may be modified to encode one or more shared characteristics (including the first shared account attribute 408), according to one or more embodiments.

Figure 5:
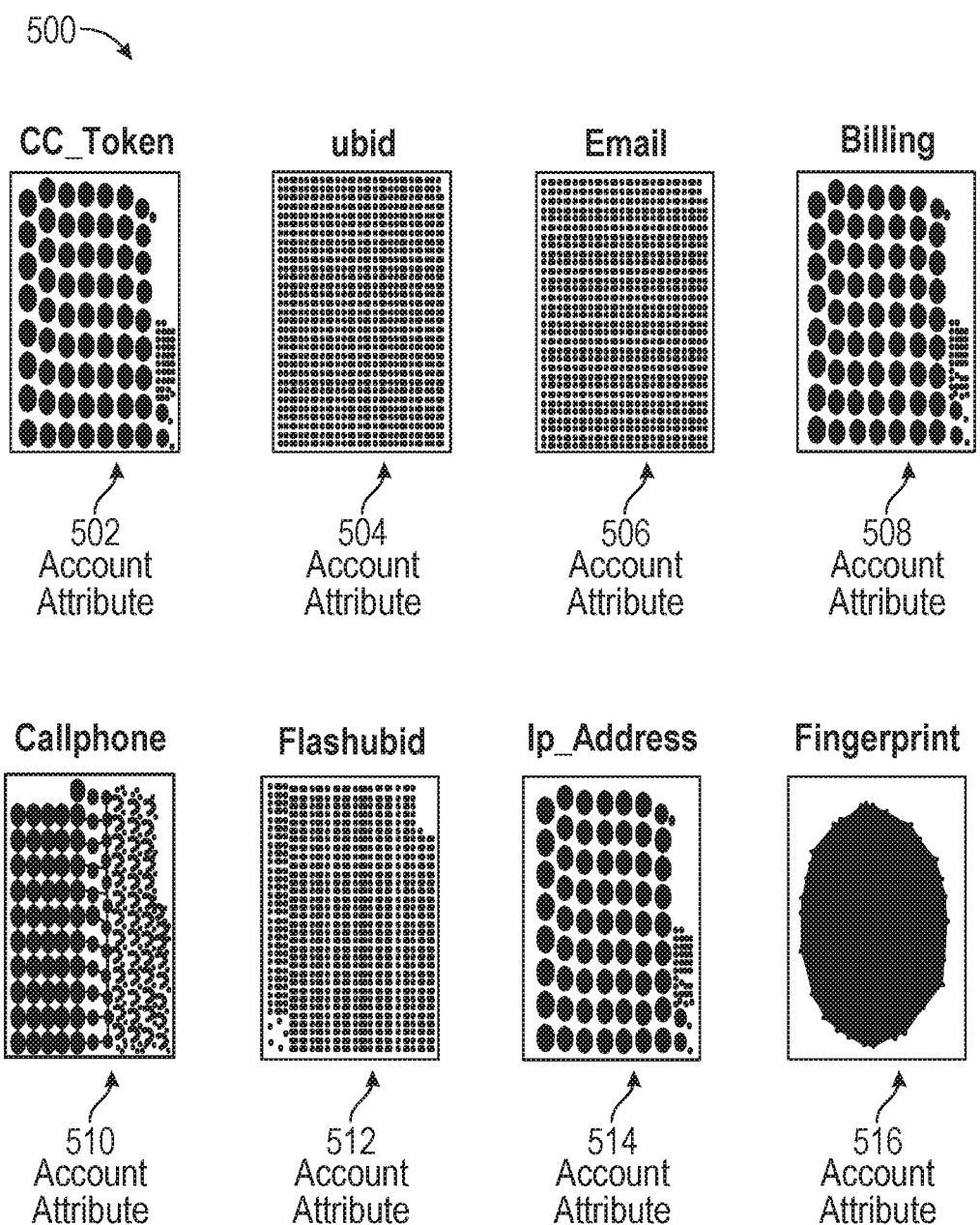
FIG. 5 is a schematic illustration of a first example graph-based cluster of a plurality of accounts using account attributes in accordance with one or more example embodiments of the disclosure.

FIG. 5 schematically illustrates an exemplary graph-based cluster 500 of a plurality of accounts using account attributes in accordance with one or more example embodiments of the disclosure. As discussed previously herein, fraudulent accounts typically share one or more account attributes, as uniquely generating individual accounts is prohibitively expensive for fraudsters. In some embodiments, these account similarities are leveraged to generate one or more account clusters according to one or more embodiments.

As illustrated in FIG. 5, the graph-based cluster 500 includes eight account attributes (e.g., the account attributes 502, 504, 506, 508, 510, 512, 514, and 516). As depicted, the eight account attributes include a cc token (e.g., a credit card token), a UBID (e.g., a device identifier such as a browser ID), an email account, a billing account, a cell phone number, a flashUBID (e.g., a software identifier such as a flash ID), an IP address, and a fingerprint (e.g., a font used by a device associated with a respective account). While the graph-based cluster 500 is depicted as having a particular set of eight account attributes for ease of illustration, it is understood that the graph-based cluster 500 may include any number of account attributes, including other account attributes according to one or more embodiments.

In some embodiments, the graph-based cluster 500 may be used to identify one or more fraud MOs according to one or more embodiments. As depicted in FIG. 5, the accounts tend to use each unique credit card, billing address, cell phone number, and IP address to create about 14 accounts. Moreover, all of the accounts share a common fingerprint. In some embodiments, the characteristics of the graph-based cluster 500 can be summarized in terms of rules. For example, a first rule may state that the credit card country is "GB," a second rule may state that the IP country is "US," a third rule may state that the associated email is structured as [four letters]@[random domain], and a fourth rule may state that the associated ASN is equal to 14618 or 16509. In some embodiments, these rules may be applied to one or more additional accounts that are not already associated with the graph-based cluster 500. In this manner, additional accounts that match a newly detected fraud MO can be efficiently included in the graph-based cluster 500.

In some embodiments, the graph-based cluster 500 may be used to generate a list of suspected fraudulent accounts. In some embodiments, the list of suspected fraudulent accounts (e.g., those accounts belonging to the graph-based cluster 500) are provided to a bulk closure system (e.g., the bulk closure system 134 depicted in FIG. 1) for additional analysis according to one or more embodiments. In some embodiments, a summarization of the common characteristics of the accounts in the graph-based cluster 500 may be provided to a bulk closure system for additional analysis. In some embodiments, a set of rules which define the graph-based cluster 500 may be provided to a bulk closure system for additional analysis.

Figure 6:
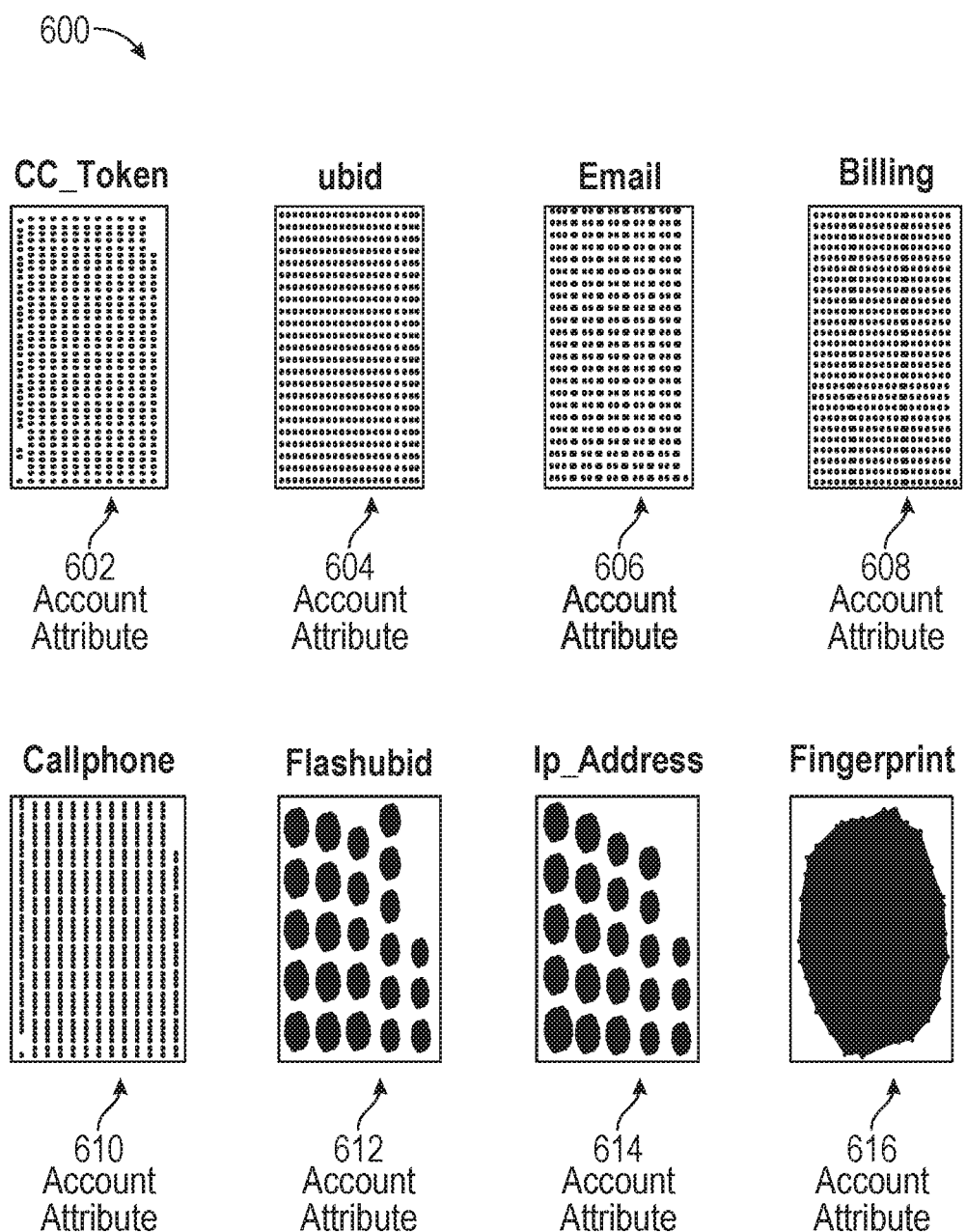
FIG. 6 is a schematic illustration of a second example graph-based cluster of a plurality of accounts using account attributes in accordance with one or more example embodiments of the disclosure.

FIG. 6 schematically illustrates an exemplary graph-based cluster 600 of a plurality of accounts using account attributes in accordance with one or more example embodiments of the disclosure. As discussed previously herein, fraudulent accounts typically share one or more account attributes, as uniquely generating individual accounts is prohibitively expensive for fraudsters. In some embodiments, these account similarities are leveraged to generate one or more account clusters according to one or more embodiments.

As illustrated in FIG. 6, the graph-based cluster 600 includes eight account attributes (e.g., the account attributes 602, 604, 606, 608, 610, 612, 614, and 616). As depicted, the eight account attributes include a cc token (e.g., a credit card token), a UBID (e.g., a device identifier such as a browser ID), an email account, a billing account, a cell phone number, a flashUBID (e.g., a software identifier such as a flash ID), an IP address, and a fingerprint (e.g., a font used by a device associated with a respective account). While the graph-based cluster 600 is depicted as having a particular set of eight account attributes for ease of illustration, it is understood that the graph-based cluster 600 may include any number of account attributes, including other account attributes according to one or more embodiments. It is further understood that the graph-based cluster 600 and the graph-based cluster 500 (depicted in FIG. 5) may include the same or different account attributes.

In some embodiments, the graph-based cluster 600 may be used to identify one or more fraud MOs according to one or more embodiments. Unlike the graph-based cluster 500, the graph-based cluster 600 does not reuse credit card, billing, or phone data. Instead, the fraudster associated with the graph-based cluster 600 reused flashUBIDs and IP addresses, in addition to a common fingerprint. The characteristics of the graph-based cluster 600 can be summarized as follows: a first rule may state that the credit card country is "RU," a second rule may state that a fingerprint (e.g., a bank name) is "Qiwi Bank," a third rule may state that an email domain is "inbox.ru," "mail.ru," "list.ru," or "bk.ru," and a fourth rule may state that the ASN is "12389."

Figure 7:
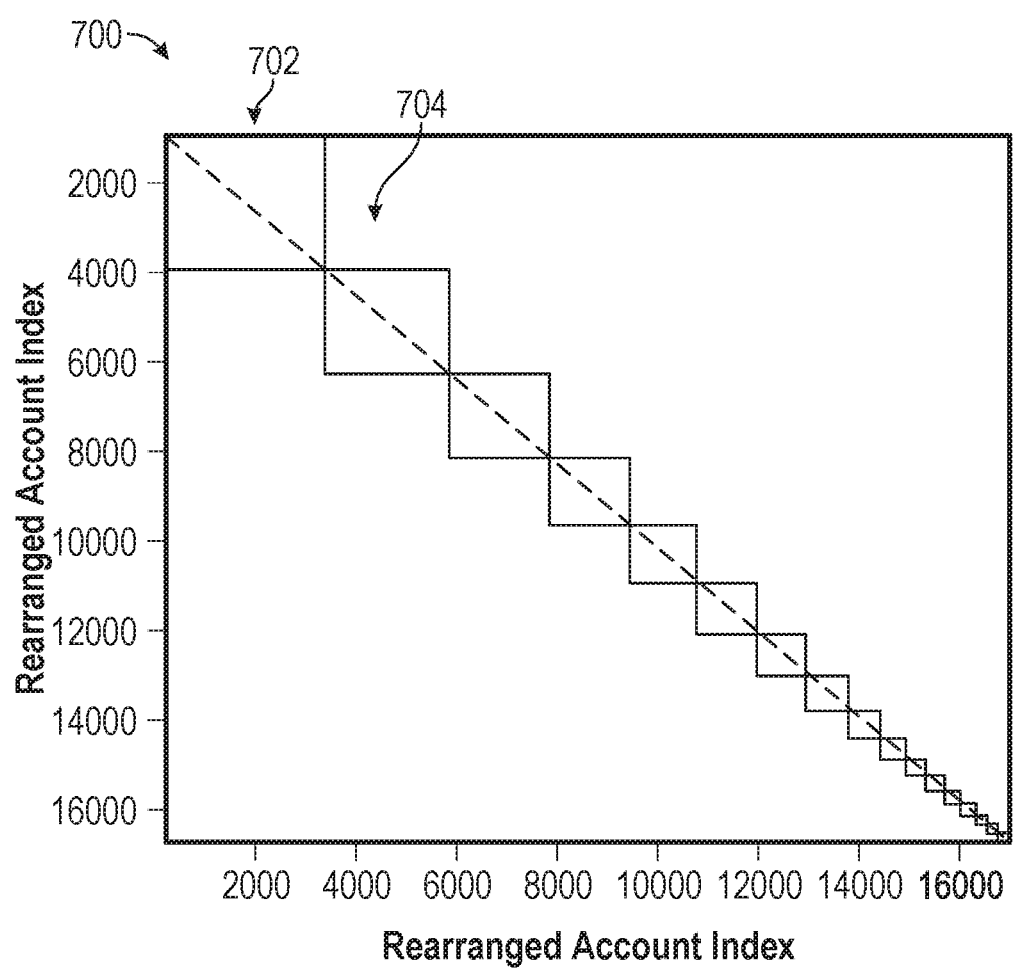
FIG. 7 is a schematic illustration of an exemplary arrangement of a plurality of account clusters in accordance with one or more example embodiments of the disclosure.

FIG. 7 schematically illustrates an exemplary graph 700 depicting an arrangement of a plurality of account clusters in accordance with one or more example embodiments of the disclosure. In some embodiments, an adjacency matrix is generated for a plurality of accounts according to one or more embodiments. For example, two accounts encoded in the adjacency matrix may be linked (e.g., a value associated with the account pair may be set to "1") if the accounts share the same values for at least one account attribute.

In some embodiments, the adjacency matrix is used to identify one or more account clusters according to one or more embodiments. For example, a first account cluster 702 may be identified corresponding to a first group of accounts having positive values encoded in their respective values in the adjacency matrix. Similarly, a second account cluster 704 may be identified corresponding to a second group of accounts having positive values encoded in their respective values in the adjacency matrix. In this manner, an arbitrary number of account clusters may be identified. In some embodiments, the adjacency matrix is mined for every possible account cluster (e.g., for every pair of at least two accounts having a shared characteristic). In other embodiments, the identification of an account cluster is limited by a predetermined threshold of required accounts (e.g., a minimum required cluster size). In other words, a threshold number of accounts may be set (e.g., 5, 10, 50, 110, etc.) that must share a common characteristic before an account cluster may be identified.

In some embodiments, the account clusters are arranged in order of size. As depicted in FIG. 7, the account clusters are arranged from largest to smallest, although it is understood that other arrangements are possible (e.g., smallest to largest). In some embodiments, a list of the largest clusters may be provided to a bulk closure system (e.g., the bulk closure system 134 depicted in FIG. 1) for prioritized investigation according to one or more embodiments. In this manner, the bulk closure system can advantageously focus on the largest account clusters first to minimize exposure or other losses associated with the fraudulent accounts.

Figure 8:
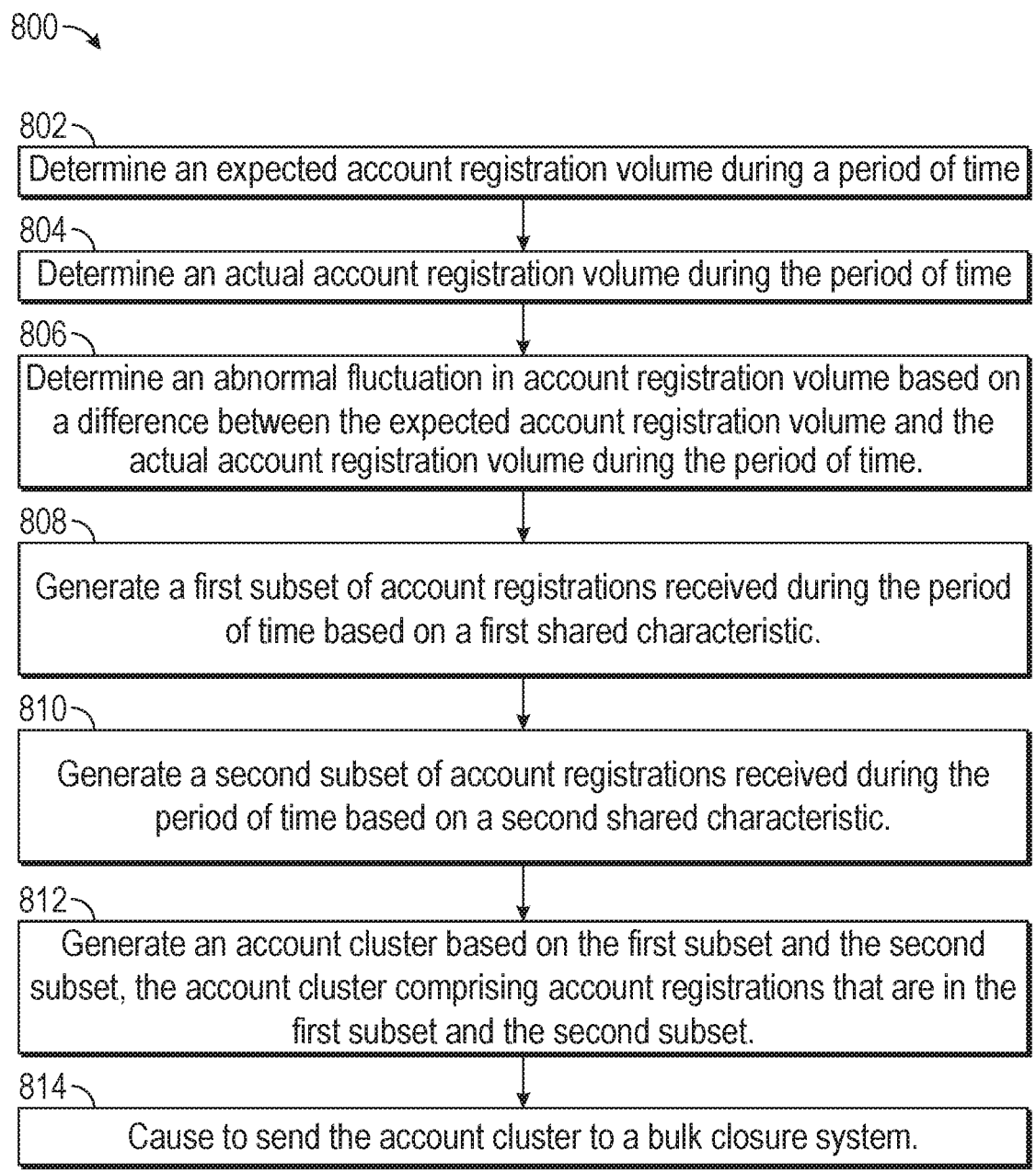
FIG. 8 is a schematic illustration of an example process flow in accordance with one or more example embodiments of the disclosure.

FIG. 8 schematically illustrates an example use case and an example process flow 800 for the real-time detection and clustering of emerging fraud patterns in accordance with one or more example embodiments of the disclosure. Some or all of the blocks of the process flow 800 may be performed in a distributed manner across any number of devices. The operations of the process flow 800 may be optional and may be performed in a different order.

At block 802, an expected account registration volume during a particular period of time is determined. The expected account registration volume can be determined according to one or more embodiments, such as in a similar manner as the predicted account registration volume 114 depicted in FIG. 1. In some embodiments, the expected account registration volume can be determined based at least in part on a historical record. The historical record may be continuously generated for a particular process window (period of time) and used to make hourly account registration volume predictions for the period of time between the current time and the end of the process window.

At block 804, an actual account registration volume during the particular period of time is determined. The actual account registration volume can be determined according to one or more embodiments, such as in a similar manner as the actual account registration volume 112 depicted in FIG. 1.

At block 806, an abnormal fluctuation in account registration volume is determined based on a difference between the expected account registration volume and the actual account registration volume during the period of time. The expected account registration volume and the actual account registration volume may be compared according to one or more embodiments. In some embodiments, the actual account registration volume must exceed the expected account registration volume by a threshold to be indicative of an abnormal account registration activity. This threshold may be increased or decreased to adjust the sensitivity of the registration volume monitoring systems or processes.

At block 808, a first subset of account registrations received during the period of time is generated based on a first shared characteristic. For example, a subset of 40 account registrations having a same IP address may be generated. In some embodiments, a graph comprising the first subset of account registrations may be generated according to one or more embodiments. The graph may include two or more vertices and one or more edges, wherein each vertex of the two or more vertices denotes an account registration of the first subset of account registrations and each edge of the one or more edges denotes the first shared characteristic. In some embodiments, each vertex and edge in the graph may be associated with a time stamp.

At block 810, a second subset of account registrations received during the period of time is generated based on a second shared characteristic. For example, a subset of 120 account registrations having a same billing address may be generated. In some embodiments, a graph comprising the second subset of account registrations may be generated according to one or more embodiments.

At block 812, an account cluster is generated based on the first subset and the second subset. In some embodiments, the account cluster includes account registrations that are members of (within) one or both of the first subset and the second subset. In some embodiments, the account cluster includes a subset of account registrations made during the period of time generated based at least in part on a number of shared characteristics satisfying a threshold. The account group may be formed according to one or more embodiments, such as in a similar manner as accomplished by the clustering system 120 depicted in FIGS. 1 and 3. In some embodiments, the account group may be formed using an adjacency matrix, such as the adjacency matrix 410 depicted in FIG. 4, based on one or more shared characteristics.

At block 814, the account cluster is sent to a bulk closure system. In some embodiments, the account group itself is sent to a bulk closure system (e.g., the bulk closure system 134 depicted in FIGS. 1 and 3). In some embodiments, details regarding the account group, such as a list of rules used to identify the account group, are sent to the bulk closure system. In some embodiments, the bulk closure system is used to make bulk fraud/no fraud decisions for the account group as a whole. In this manner, a large number of fraudulent accounts can be investigated and closed at the same time.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art may recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 9:
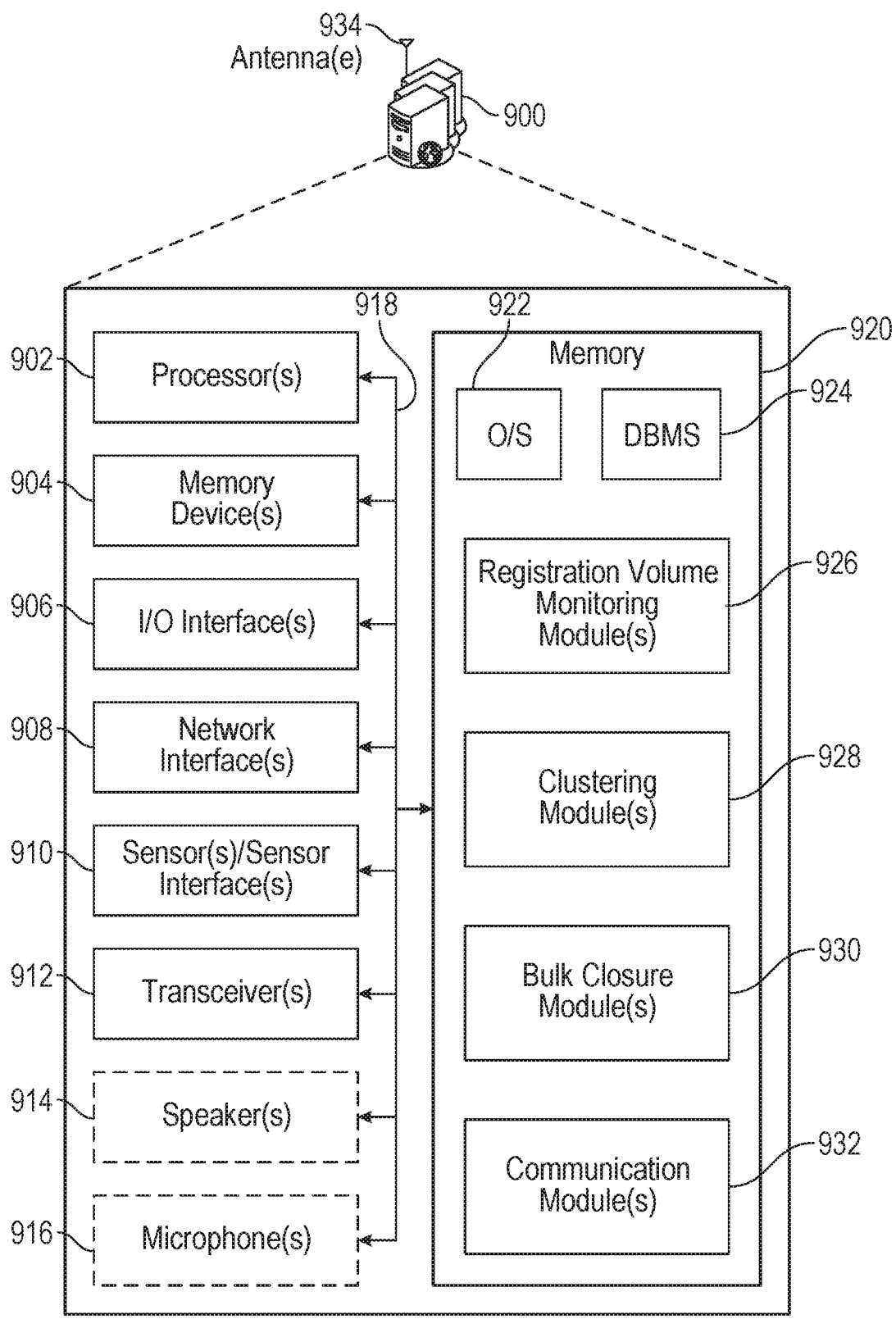
FIG. 9 is a schematic block diagram of an illustrative device in accordance with one or more example embodiments of the disclosure.

FIG. 9 is a schematic block diagram of an illustrative remote server 900 in accordance with one or more example embodiments of the disclosure. The remote server 900 may include any suitable computing device capable of receiving and/or generating data including, but not limited to, a remote system (e.g., the registration volume monitoring system 108, the clustering system 120, or the bulk closure system 134 of FIG. 1), or the like. The remote server 900 may correspond to an illustrative device configuration for the devices of FIGS. 1-8.

The remote server 900 may be configured to communicate via one or more networks with one or more servers, search engines, user devices, or the like. In some embodiments, a single remote server or single group of remote servers may be configured to perform product collection generation, product collection surfacing, and/or machine-learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and memory 920. The remote server 900 may further include one or more buses 918 that functionally couple various components of the remote server 900. The remote server 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the remote server 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the remote server 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The memory 920 may include removable storage and/or non-removable storage including, but not limited to, magnetic storage, optical disk storage, and/or tape storage. The memory 920 may provide non-volatile storage of computer-executable instructions and other data. The memory 904 and the memory 920, removable and/or non-removable, are examples of computer-readable storage media (CRSM) as that term is used herein.

The memory 920 may store computer-executable code, instructions, or the like that may be loadable into the memory 904 and executable by the processor(s) 902 to cause the processor(s) 902 to perform or initiate various operations. The memory 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to memory 920 for non-volatile storage.

More specifically, the memory 920 may store one or more operating systems (O/S) 922; one or more database management systems (DBMS) 924; and one or more program module(s), applications, engines, computer-executable code, scripts, or the like such as, for example, one or more registration volume monitoring module(s) 926, one or more clustering module(s) 928, one or more bulk closure module(s) 930, and one or more communication module(s) 932. Some or all of these module(s) may be sub-module(s). Any of the components depicted as being stored in memory 920 may include any combination of software, firmware, and/or hardware. The software and/or firmware may include computer-executable code, instructions, or the like that may be loaded into the memory device(s) 904 for execution by one or more of the processor(s) 902. Any of the components depicted as being stored in memory 920 may support functionality described in reference to correspondingly named components earlier in this disclosure.

The memory 920 may further store various types of data utilized by components of the remote server 900. Any data stored in the memory 920 may be loaded into the memory 904 for use by the processor(s) 902 in executing computer-executable code. In addition, any data depicted as being stored in the memory 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, threat intelligence data, whitelisted entity data, user account information, user profile information, machine-learning models, historical accuracy data, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the remote server 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the registration volume monitoring module(s) 926 may include computer-executable instructions, code, or the like that responsive to execution by one or more of the processor(s) 902 may perform functions including, but not limited to, determining an expected account registration volume over a period of time, determining an actual account registration volume over the period of time, and/or determining that a difference between the expected account registration volume and the actual account registration volume is indicative of an abnormal account registration activity, according to one or more embodiments.

The clustering module(s) 928 may include computer-executable instructions, code, or the like that responsive to execution by one or more of the processor(s) 902 may perform functions including, but not limited to, the clustering of one or more subsets of accounts into one or more account clusters according to shared characteristics, the generation of one or more adjacency matrices, and the dynamic reordering of account clusters, according to one or more embodiments.

The bulk closure module(s) 930 may include computer-executable instructions, code, or the like that responsive to execution by one or more of the processor(s) 902 may perform functions including, but not limited to, the automated investigation of one or more account clusters for bulk closure.

The communication module(s) 932 may include computer-executable instructions, code, or the like that responsive to execution by one or more of the processor(s) 902 may perform functions including, but not limited to, communicating with one or more devices, for example, via wired or wireless communication, communicating with remote servers, communicating with remote datastores, sending or receiving notifications or alerts, communicating with cache memory data, and the like.

Referring now to other illustrative components depicted as being stored in the memory 920, the O/S 922 may be loaded from the memory 920 into the memory 904 and may provide an interface between other application software executing on the remote server 900 and hardware resources of the remote server 900. More specifically, the O/S 922 may include a set of computer-executable instructions for managing hardware resources of the remote server 900 and for providing common services to other application programs (e.g., managing memory allocation among various application programs). In certain example embodiments, the O/S 922 may control execution of the other program module(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the memory 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 900 is a mobile device, the DBMS 924 may be any suitable light-weight DBMS optimized for performance on a mobile device.

Referring now to other illustrative components of the remote server 900, the input/output (I/O) interface(s) 906 may facilitate the receipt of input information by the remote server 900 from one or more I/O devices as well as the output of information from the remote server 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 900 may further include one or more network interface(s) 908 via which the remote server 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(e) 934 may include any suitable type of antenna depending, for example, on the communications protocols used to transmit or receive signals via the antenna(e) 934. Non-limiting examples of suitable antennas may include directional antennas, non-directional antennas, dipole antennas, folded dipole antennas, patch antennas, multiple-input multiple-output (MIMO) antennas, or the like. The antenna(e) 934 may be communicatively coupled to one or more transceivers 912 or radio components to which or from which signals may be transmitted or received.

As previously described, the antenna(e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 934 may additionally, or alternatively, include a Wi-Fi antenna configured to transmit or receive signals in accordance with established standards and protocols, such as the IEEE 752.11 family of standards, including via 2.4 GHz channels (e.g., 752.11b, 752.11g, 752.11n), 5 GHz channels (e.g., 752.11n, 752.11ac), or 60 GHz channels (e.g., 752.11ad). In alternative example embodiments, the antenna(e) 934 may be configured to transmit or receive radio frequency signals within any suitable frequency range forming part of the unlicensed portion of the radio spectrum.

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the remote server 900 to communicate with other devices. The transceiver(s) 912 may include hardware, software, and/or firmware for modulating, transmitting, or receiving—potentially in cooperation with any of antenna(e) 934—communications signals according to any of the communications protocols discussed above including, but not limited to, one or more Wi-Fi and/or Wi-Fi direct protocols, as standardized by the IEEE 752.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the remote server 900. The transceiver(s)

912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the memory 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the remote server 900 may include alternate and/or additional hardware, software, or firmware components beyond those described or depicted without departing from the scope of the disclosure. More particularly, it should be appreciated that software, firmware, or hardware components depicted as forming part of the remote server 900 are merely illustrative and that some components may not be present or additional components may be provided in various embodiments. While various illustrative program module(s) have been depicted and described as software module(s) stored in memory 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to at least one memory, an expected account registration volume for a service platform during a period of time;
    determining, by the one or more computer processors, an actual account registration volume for the service platform during the period of time;
    comparing, by the one or more computer processors, the expected account registration volume to the actual account registration volume;
    determining, by the one or more computer processors, abnormal account registration activity based on a difference between the expected account registration volume and the actual account registration volume exceeding a threshold;
    generating, by the one or more computer processors, a first graph comprising a first subset of account registrations received during the period of time based on a first shared characteristic;
    generating, by the one or more computer processors, a second graph comprising a second subset of account registrations received during the period of time based on a second shared characteristic;
    generating, by the one or more computer processors, a first account cluster based on the first graph and the second graph, the account cluster comprising account registrations that are in the first subset and the second subset;
    generating, by the one or more computer processors, a third graph comprising a third subset of account registrations received during the period of time based on a third shared characteristic;
    generating, by the one or more computer processors, a fourth graph comprising a fourth subset of account registrations received during the period of time based on a fourth shared characteristic;
    generating, by the one or more computer processors, a fifth graph comprising a fifth subset of account registrations received during the period of time based on a fifth shared characteristic;
    generating, by the one or more computer processors, a second account cluster based on the third graph, the fourth graph, and the fifth graph, the second account cluster comprising account registrations that are in the third subset, the fourth subset and the fifth subset; and
    causing to send, by the one or more computer processors, the first account cluster and the second account cluster to a bulk closure system.

2. The method of claim 1, wherein determining, by one or more computer processors coupled to at least one memory, an expected account registration volume for a service platform during a period of time further comprises:
    determining, by the one or more computer processors, a historic registration volume during a second period of time ending prior to the period of time;
    generating, by the one or more computer processors, an autoregressive model having exogenous inputs based on the historic registration volume; and
    determining, by the one or more computer processors, a forecast of the expected account registration volume based on the autoregressive model.

3. The method of claim 2, wherein the autoregressive model comprises a first term associated with a daily or weekly account registration seasonality, a second term associated with an increasing or decreasing account registration trend, and a third term associated with a dependency on previous observations.

4. The method of claim 1, wherein the first shared characteristic comprises a payment instrument, a phone number, an address, an email address, an IP address, a device ID, an application ID, a fingerprint, or the use of a same instance on the service platform.

5. A method comprising:
    determining, by one or more computer processors coupled to at least one memory, an expected account registration volume during a period of time;
    determining, by the one or more computer processors, an actual account registration volume during the period of time;
    determining, by the one or more computer processors, an abnormal fluctuation in account registration volume based on a difference between the expected account registration volume and the actual account registration volume during the period of time;
    generating, by the one or more computer processors, a first subset of account registrations received during the period of time based on a first shared characteristic;
    generating, by the one or more computer processors, a second subset of account registrations received during the period of time based on a second shared characteristic;
    generating, by the one or more computer processors, an account cluster based on the first subset and the second subset, the account cluster comprising account registrations that are in the first subset and the second subset; and
    causing to send, by the one or more computer processors, the account cluster to a bulk closure system.

6. The method of claim 5, wherein determining, by the one or more computer processors, the expected account registration volume during the period of time further comprises:
    determining, by the one or more computer processors, a historic registration volume during a second period of time ending prior to the period of time;
    generating, by the one or more computer processors, an autoregressive model based on the historic registration volume; and
    determining, by the one or more computer processors, a forecast of the expected account registration volume based on the autoregressive model.

7. The method of claim 5, wherein the difference satisfies a threshold.

8. The method of claim 5, wherein generating the first subset of account registrations further comprises:
    generating, by the one or more computer processors, a graph comprising two or more vertices and one or more edges;
    wherein a first vertex of the two or more vertices denotes an account registration of the first subset of account registrations and a first edge of the one or more edges denotes the first shared characteristic.

9. The method of claim 8, wherein the first vertex and the first edge are associated with a time stamp.

10. The method of claim 5, further comprising:
    determining, by the one or more computer processors, a registration velocity associated with the account cluster; and
    generating, by the one or more computer processors, an alert based on the registration velocity satisfying a threshold.

11. The method of claim 5, further comprising:
    generating, by the one or more computer processors, a rule associated with the first and second shared characteristics of the account cluster;
    determining, by the one or more computer processors, an account registration that is not within the account cluster that satisfies the rule; and
    modifying, by the one or more computer processors, the account cluster to include the account registration.

12. The method of claim 5, further comprising:
    generating, by the one or more computer processors, a third subset of account registrations received during the period of time based on a third shared characteristic;
    generating, by the one or more computer processors, a fourth subset of account registrations received during the period of time based on a fourth shared characteristic;
    generating, by the one or more computer processors, a fifth subset of account registrations received during the period of time based on a fifth shared characteristic;
    generating, by the one or more computer processors, a second account cluster based on the third subset, the fourth subset, and the fifth subset, the second account cluster comprising account registrations that are in the third subset, the fourth subset and the fifth subset; and
    causing to send, by the one or more computer processors, the second account cluster to the bulk closure system.

13. A device comprising:
    at least one memory that stores computer-executable instructions; and
    at least one processor configured to access the memory and execute the computer-executable instructions to:
        determine an expected account registration volume during a period of time;
        determine an actual account registration volume during the period of time;
        determine an abnormal fluctuation in account registration volume based on a difference between the expected account registration volume and the actual account registration volume during the period of time;
        generate a first subset of account registrations received during the period of time based on a first shared characteristic;
        generate a second subset of account registrations received during the period of time based on a second shared characteristic;
        generate an account cluster based on the first subset and the second subset, the account cluster comprising account registrations that are in the first subset and the second subset; and
        cause to send the account cluster to a bulk closure system.

14. The device of claim 13, wherein determining an expected account registration volume during a period of time further comprises:
    determining a historic registration volume over a previous period of time;
    generating an autoregressive model having exogenous inputs based on the historic registration volume; and
    forecasting the expected account registration volume based on the autoregressive model.

15. The device of claim 14, wherein the autoregressive model comprises a first term associated with a daily or weekly account registration seasonality, a second term associated with an increasing or decreasing account registration trend, and a third term associated with a dependency on previous observations.

16. The device of claim 13, wherein the shared characteristics comprise one or more of a payment instrument, a phone number, an address, an email address, an IP address, a device ID, an application ID, a fingerprint, or the use of a same instance on the service platform.

17. The device of claim 13, wherein the at least one processor is further configured to:
   determine a predetermined threshold for indicating an abnormal account registration activity; and
   determine that the difference between the expected account registration volume and the actual account registration volume exceeds the predetermined threshold.

18. The device of claim 13, wherein generating the account cluster further comprises generating an adjacency matrix encoding the first and second shared characteristics for one or more pairs of account registrations in the account cluster.

19. The device of claim 13, further comprising:
   generating a rule associated with the first and second shared characteristics of the account cluster;
   identify an account registration that is not within the account cluster that satisfies the rule; and
   modify the account cluster to include the account registration.

20. The device of claim 19, wherein the at least one processor is further configured to:
   generate a third subset of account registrations received during the period of time based on a third shared characteristic;
   generate a fourth subset of account registrations received during the period of time based on a fourth shared characteristic;
   generate a fifth subset of account registrations received during the period of time based on a fifth shared characteristic;
   generate a second account cluster based on the third subset, the fourth subset, and the fifth subset, the second account cluster comprising account registrations that are in the third subset, the fourth subset and the fifth subset; and
   cause to send the second account cluster to the bulk closure system.

* * * * *